US007905383B1

(12) United States Patent
Torng et al.

(10) Patent No.: US 7,905,383 B1
(45) Date of Patent: Mar. 15, 2011

(54) MANUFACTURING METHOD OF METAL MATRIX COMPOSITE USING FRICTION STIR WELDING

(75) Inventors: Shan Torng, Taipei (TW); Jong-Ning Aoh, Chiayi County (TW); Ji-Wei Huang, Hsinchu County (TW); Cheng-Li Chuang, Xiufeng Vil (TW); Sy-Cherng Yang, Taipei County (TW); Yue-Poe Huang, Taipei (TW)

(73) Assignee: Chung Shan Institute of Science and Technology, Armaments Bureau, M.N.D., Taoyuan County (TW)

( * ) Notice: Subject to any disclaimer, the term of this patent is extended or adjusted under 35 U.S.C. 154(b) by 0 days.

(21) Appl. No.: 12/644,569

(22) Filed: Dec. 22, 2009

(51) Int. Cl.
*B23K 20/12* (2006.01)
(52) U.S. Cl. ................... 228/112.1; 228/248.1
(58) Field of Classification Search .......... None
See application file for complete search history.

(56) References Cited

U.S. PATENT DOCUMENTS

| | | | | |
|---|---|---|---|---|
| 5,342,502 A * | 8/1994 | Peng et al. | ................ | 205/109 |
| 6,457,629 B1 * | 10/2002 | White | ................ | 228/112.1 |
| 7,163,138 B1 * | 1/2007 | Dudt et al. | ................ | 228/112.1 |
| 2003/0042292 A1 * | 3/2003 | Hatten et al. | ................ | 228/112.1 |
| 2003/0141344 A1 * | 7/2003 | Foster et al. | ................ | 228/114.5 |
| 2004/0004107 A1 * | 1/2004 | Litwinski | ................ | 228/56.3 |
| 2004/0265503 A1 * | 12/2004 | Clayton et al. | ................ | 427/446 |
| 2005/0249978 A1 * | 11/2005 | Yao | ................ | 428/699 |
| 2006/0049234 A1 * | 3/2006 | Flak et al. | ................ | 228/112.1 |
| 2006/0108394 A1 * | 5/2006 | Okaniwa et al. | ................ | 228/101 |
| 2006/0208034 A1 * | 9/2006 | Packer et al. | ................ | 228/112.1 |
| 2006/0273140 A1 * | 12/2006 | Ghosh | ................ | 228/112.1 |
| 2007/0044406 A1 * | 3/2007 | Van Aken et al. | ................ | 52/459 |
| 2007/0119276 A1 * | 5/2007 | Liu | ................ | 75/232 |
| 2007/0241164 A1 * | 10/2007 | Barnes et al. | ................ | 228/101 |
| 2007/0297935 A1 * | 12/2007 | Langan et al. | ................ | 420/528 |
| 2008/0041921 A1 * | 2/2008 | Creehan et al. | ................ | 228/101 |
| 2008/0047222 A1 * | 2/2008 | Barnes | ................ | 52/693 |
| 2008/0156846 A1 * | 7/2008 | Manicke et al. | ................ | 228/112.1 |
| 2008/0311420 A1 * | 12/2008 | Zillmer et al. | ................ | 428/637 |
| 2008/0318794 A1 * | 12/2008 | Takahashi et al. | ................ | 505/230 |
| 2009/0068491 A1 * | 3/2009 | Maruko et al. | ................ | 428/615 |
| 2009/0068492 A1 * | 3/2009 | Fujii et al. | ................ | 428/615 |
| 2009/0087681 A1 * | 4/2009 | Decker et al. | ................ | 428/649 |
| 2009/0152328 A1 * | 6/2009 | Okamoto et al. | ................ | 228/112.1 |
| 2009/0226789 A1 * | 9/2009 | Mizusaki et al. | ................ | 429/30 |
| 2009/0258232 A1 * | 10/2009 | Brice | ................ | 428/408 |
| 2010/0089976 A1 * | 4/2010 | Szymanski et al. | ................ | 228/113 |
| 2010/0089977 A1 * | 4/2010 | Chen et al. | ................ | 228/114.5 |

FOREIGN PATENT DOCUMENTS

| JP | 2001-205457 A | * | 7/2001 |
|---|---|---|---|
| JP | 2003-126970 A | * | 5/2003 |
| JP | 2003-126971 A | * | 5/2003 |

* cited by examiner

Primary Examiner — Kiley Stoner
(74) Attorney, Agent, or Firm — Rosenberg, Klein & Lee

(57) ABSTRACT

A metal layer such as copper, silver or nickel is coated on a surface of reinforcement particles (aluminum oxide or silicon carbide powder) by electroless plating technique. The metal-coated reinforcement particles with an appropriate volume fraction are inserted into the gap between two metal plates or two metal matrix composite (MMC) plates. The reinforcement particles are stirred into the metal plates or the MMC plates by friction stir welding (FSW) to form a butt weld metal containing reinforcement particles. Or the metal-coated reinforcement particles deposited on the surface of the metal plates or the MMC plates and then are stirred into base material of the metal plates. The metal-coated reinforcement particles are uniformly distributed in a weld metal by such stirring, the coated metal layer on the surface of the reinforcement particles form an alloy with metallurgical bonding.

7 Claims, 4 Drawing Sheets

MANUFACTURING METHOD OF METAL MATRIX COMPOSITE USING FRICTION STIR WELDING

BACKGROUND OF THE INVENTION

1. Fields of the Invention

The present invention relates to a manufacturing method of metal matrix composites (MMC), especially to a manufacturing method in which friction stir welding (FSW) is applied to produce MMC.

2. Descriptions of Related Art

In recent years, FSW technique that joins light-weight aluminum alloy and magnesium alloy has made great progress. The technique is applied to weld and join the metal plates by stirring the materials in solid state temperature range and welding them together using a stir tool driven by milling machines, multi-axis machine centers, or robots. The technique overcomes shortcomings of conventional electric arc welding such as low welding speed and reduced strength of weld metal and becomes an innovative method for welding light weight alloy. The FSW has been applied to manufacturing of components of vehicles, boats, and aircraft structures and skins.

The addition of micron-scale reinforcement particles such as $Al_2O_3$ or SiC a particulate into aluminum alloy matrix to form reinforced MMC has been developed for more than thirty years. After particulate reinforcement, the mechanical properties of metal matrix alloy are improved effectively so that MMC has been applied to components requiring higher strength and light weight. Most of MMCs have been applied in aviation or aerospace industry as structural material of flight vehicles. The most common way of adding $Al_2O_3$ or SiC reinforcement particles is smelting. The particles are added into a liquid-phase material during the smelting process and are further stirred during the solidification process. Other than this process, there is hardly further technical information regarding adding particles into aluminum alloy for producing MMC.

There are three main problems in welding the particulate reinforced MMC:

1. Arc welding of the particulate reinforced MMC: after electric arc welding, particles of the MMC exhibit a non-uniform distribution in weld metal. Also particle loss may occur. Thus the strength of the weld metal is dramatically reduced due to lacking of reinforcement particles. Thus, the welding of MMC has been always a tough issue.

2. Uniform distribution of reinforcement particles in base material of MMC:

during the smelting process, the addition of $Al_2O_3$ or SiC reinforcement particles into molten metal may result in a non-uniform distribution or formation of clusters. The uneven distribution of reinforcement particles in MMC causes heterogeneity and anisotropy of maternal. Thus how to improve the uniformity of particles distribution in MMC is also an important issue.

3. metallurgical bonding between reinforcement particles and base material:

most of the reinforcement particles are $Al_2O_3$ or SiC ceramic powder of irregular shape with particle diameter ranging from 10 µm to 50 µm. These reinforcement particles are embedded in aluminum alloy base material without metallurgical bonding with the matrix. The composite matrix is achieved merely by adhesion between base material and particles. The lack of the metallurgical bonding between particles and base material not only restricts the reinforcement effect but also reduces the fatigue strength of the MMC due to formation of microcracks caused by detachment of the particles with the base material. Thus how to enhance the bonding strength between the particles and the base material is a substantial issue. Previous studies have been conducted to evaluate the feasibility of FSW applied to MMC. It was found that the hardness and the strength of weld metal significantly decreased even the reinforcement particles are distributed uniformly in weld metal of the MMC. Thus the reinforcing effect of the particles needs to be further improved.

SUMMARY OF THE INVENTION

Therefore it is a primary object of the present invention to provide a manufacturing method of MMC using FSW that enhances mechanical strength of weld metal effectively through achieving a metallurgical bonding between base metal and reinforcement particles coated with a metal film.

It is a furthers object of the present invention to provide a manufacturing method of MMC using FSW that improves the fatigue strength of MMC materials through achieving a metallurgical bonding between base metal material and reinforcement particles coated with a metal film.

In order to achieve above objects, the present invention provides a manufacturing method in which FSW is applied to MMC. A metal layer such as copper, silver and nickel is coated on surface of reinforcement particles by a technique such as electroless plating. The thickness of the metal layer can be adjusted according to electrolyte concentration and reaction time. Generally, a dense metal coating layer can be adhered to the reinforcement particles without detachment. A certain volume fraction of the metal-coated reinforcement particles is inserted between two metal plates or two MMC plates and the particles are stirred and mixed into the metal plates or the MMC plates by FSW to form a butt weld metal of the particulate reinforced MMC plate. The metal-coated particles can also be applied to the surface of the metal plates or the MMC plates and then are stirred into the base material of the metal plates or the MMC plates by FSW. The metal-coated particles are uniformly distributed in weld metal (or stir zone). Metallurgical bonding between the metal film coated on the surface of the reinforcement particles and the base material is achieved by forming an alloy.

BRIEF DESCRIPTION OF THE DRAWINGS

The structure and the technical means adopted by the present invention to achieve the above and other objects can be best understood by referring to the following detailed description of the preferred embodiments and the accompanying drawing wherein.

DETAILED DESCRIPTION OF THE PREFERRED EMBODIMENT

At first, welding of particulate reinforced MMC using FSW overcomes problems which occur with conventional inert gas tungsten arc welding (GTAW). The inventor has successfully stirred reinforcement particles into butt weld metal of two aluminum or magnesium alloy plates by FSW. The reinforcement particles exhibit a uniform distribution in the weld metal (or stir zone) as well as a uniform distribution in the onion rings of the stir zone. However, both the strength and the hardness of the weld metal are not substantially improved. Nevertheless, the results this study at least revealed that stirring reinforcement particles into metal or MMC plates by FSW to form a weld metal with uniformly distributed reinforcement particles is completely feasible.

In order to improve hardness and strength of the MMC weld metal, measures must be taken to allow the existed or added reinforcement particles to play an effective critical role of reinforcement in MMC. An effective method is required to achieve metallurgical bonding of sufficient strength between reinforcement particles and base material after friction stir processing, not merely mixing the reinforcement particles into base material. In order to archive this goal, the present invention proposes plating of metal layer on surfaces of the reinforcement particles to become metal-coated particles prior to FSW. Thus when particles are stirred into the weld metal of MMC, a metallurgical bonding with sufficient strength is formed between the particle and the base material since the reinforcement now particles play an effective role in particulate reinforcement in MMC, the strength of the weld metal of MMC is further improved.

Figure 1:
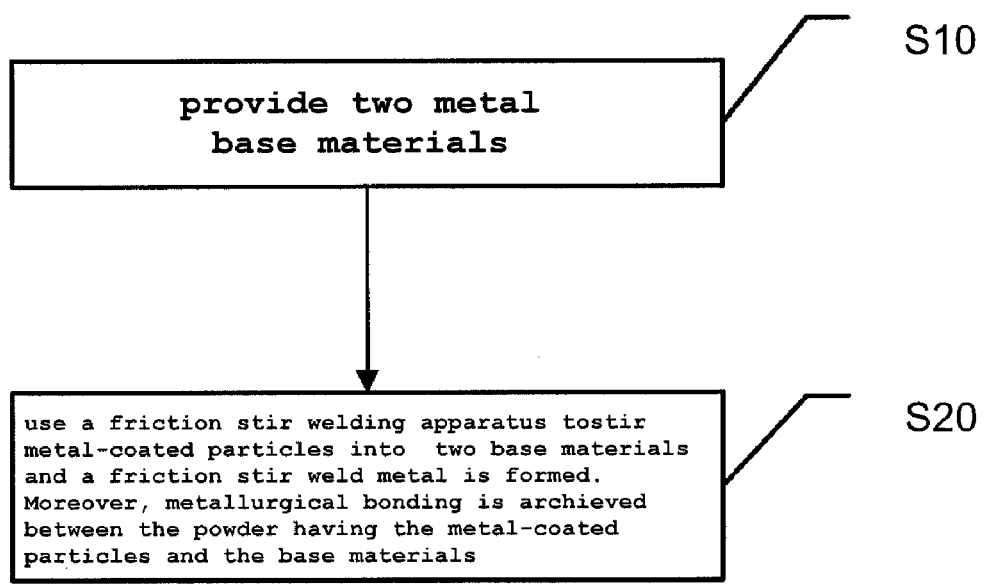
FIG. 1 is a flow chart of an embodiment according to the present invention.

Refer to FIG. 1, a flow chart of an embodiment according to the present invention is revealed. As shown in figure, a manufacturing method in which MMC is produced using friction stir Step S10: provide two metal base materials; and Step S20: use a FSW apparatus to stir metal-coated particles into two base materials and a friction stir weld metal is formed. Moreover, metallurgical bonding is achieved between the metal-coated particles and the base materials.

In the step S10, the two base materials are selected from aluminum alloys, magnesium alloys, alloy matrix composites and magnesium alloy matrix composites.

In the step S20, the metal layer is coated on surface of the reinforcement particles by an electroless plating process. The particle diameter ranges from 0.25 μm to 70 μm. And material of the metal coating layer is selected from copper, silver and nickel. The reinforcement particles are silicon carbide or aluminum oxide. The volume fraction of the metal-coated reinforcement particles added into weld metal of two base materials ranges from 0% to 30%.

Figure 2:
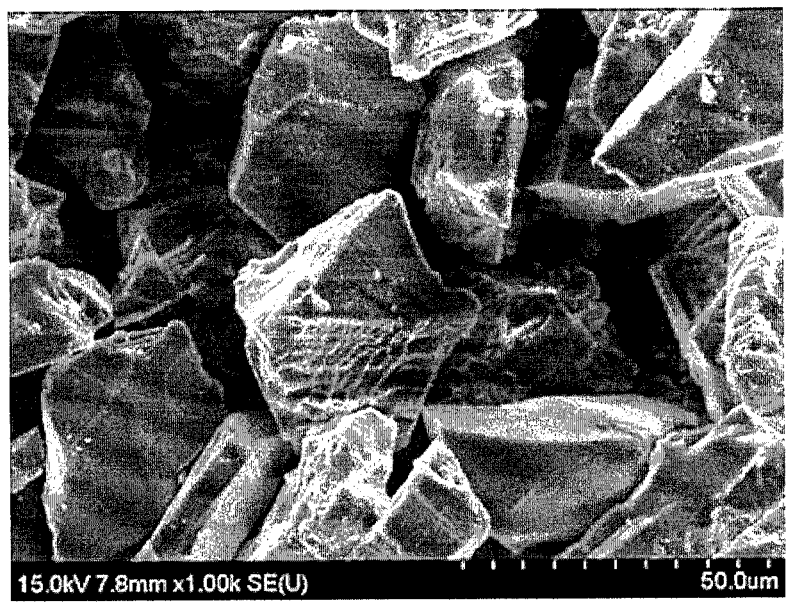
FIG. 2 is a scanning electron microscope (SEM) image of aluminum oxide powder.
Figure 3:
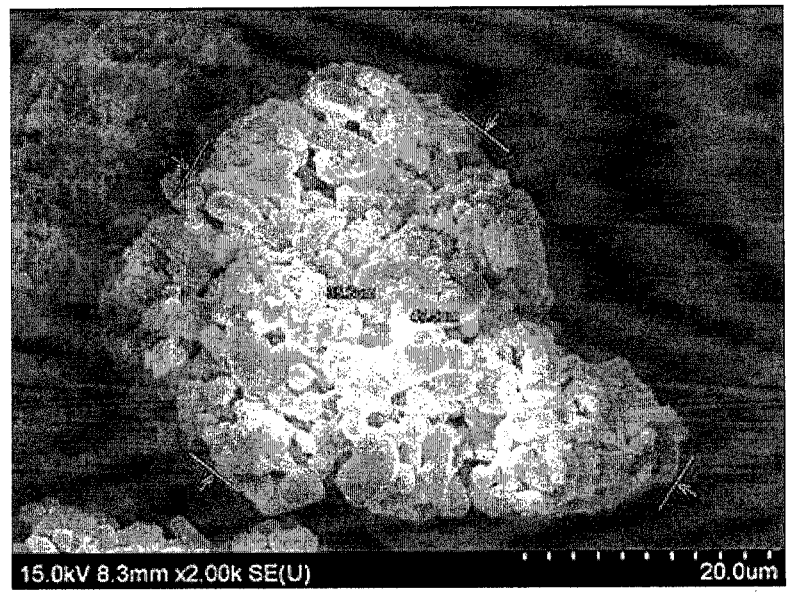
FIG. 3 is a scanning electron microscope (SEM) image of aluminum oxide powder coated with copper.

In the following example, the powder is aluminum oxide, the metal-coated layer is copper, and the metal base material is aluminum alloy 6061. Refer to FIG. 2, a scanning electron microscope (SEM) image of aluminum oxide particles without copper coating shows that the morphology of the particles is irregular with cleavages. Refer to FIG. 3, after being coated with copper, the surface of aluminum oxide particles is completely covered by copper.

Figure 4:
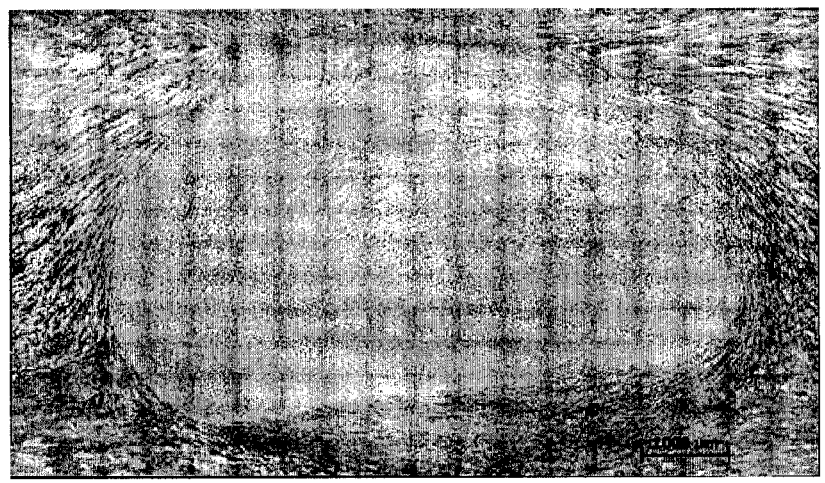
FIG. 4 is a cross-sectional macrograph of a FSW weld of aluminum alloy 6061 without addition of copper-coated reinforcement particles.
Figure 5:
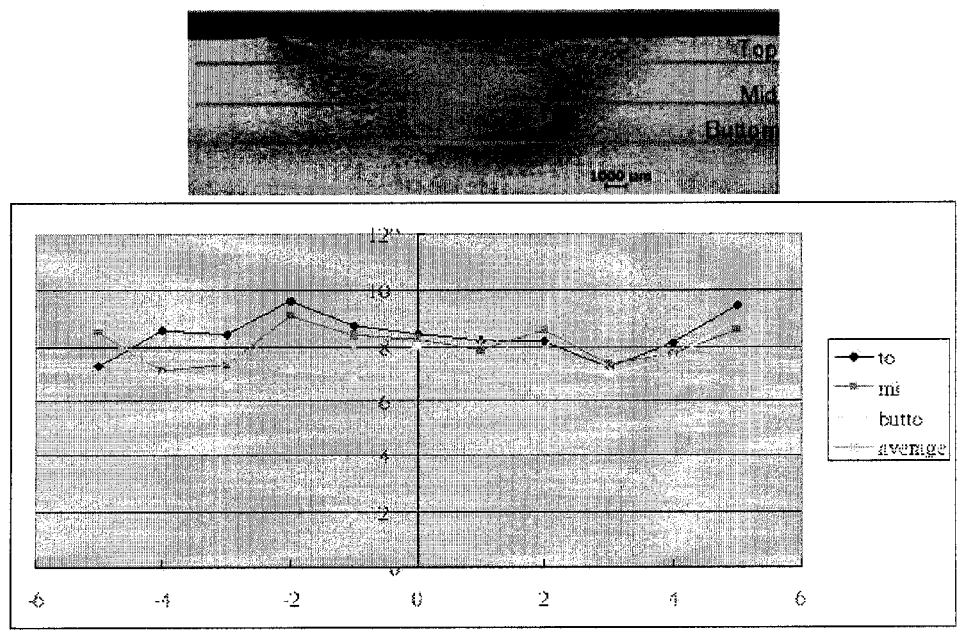
FIG. 5 shows the results of hardness tests carried out across the FSW weld of FIG. 4.

In order to prove that the weld metal hardness can be effectively improved by stirring copper-coated aluminum oxide particles into aluminum alloy 6061 through a firm metallurgical bonding between aluminum oxide particles and aluminum alloy 6061, comparison is conducted between FSW weld metal of aluminum alloy 6061 without reinforcement particles (not aluminum alloy 6061 metal matrix composite) and FSW weld metal of aluminum alloy 6061 with copper-coated reinforcement particles (not aluminum alloy 6061 metal matrix composite). Refer to FIG. 4, it is a cross section macrograph showing a FSW weld metal of aluminum alloy 6061 without reinforcement particles. The microstructure of the stir zone shows several features such as formation of onion rings and grain refinement in the center. Refer to FIG. 5, hardness tests are carried out across the cross-section of weld metal and the results are shown. The results of the hardness tests indicate that the hardness of the FSW weld metal of aluminum alloy 6061 without reinforcement particles (not aluminum alloy 6061 metal matrix composite) did not increase significantly after FSW and the hardness level of the weld metal is similar to that of the base material.

Figure 6:
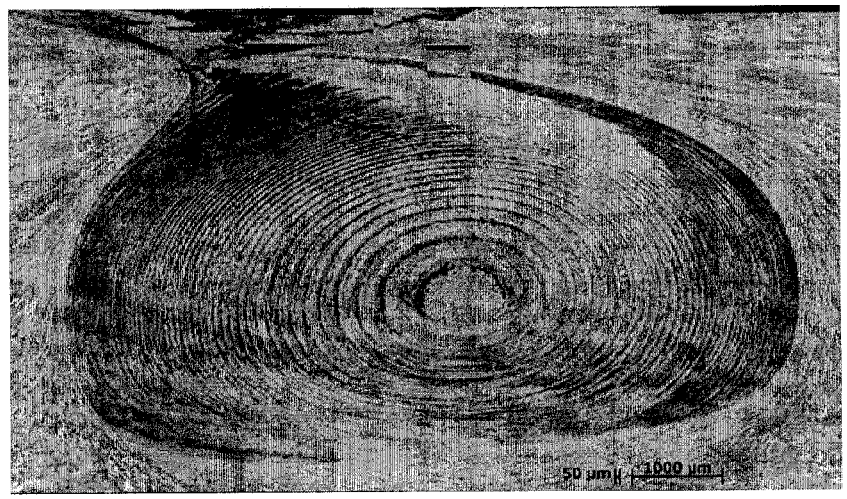
FIG. 6 is a cross-sectional macrograph of a FSW weld of aluminum alloy 6061 added with copper coated aluminum oxide particles addition.

After being added with copper-coated aluminum oxide particles, microstructure of the FSW weld metal (stir zone) of aluminum alloy 6061 shown in FIG. 6 reveals that the dark copper-coated aluminum oxide particles are distributed evenly within the onion rings of the FSW weld metal in addition to the feature of formation of onion rings.

Figure 7:
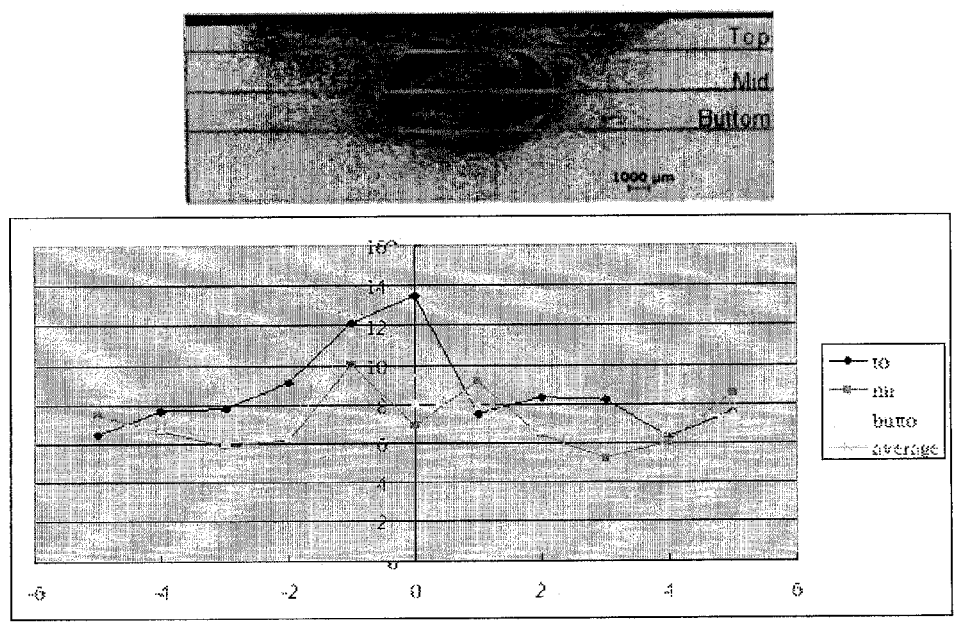
FIG. 7 shows the results of hardness tests carried out across the FSW weld of FIG. 6.

FIG. 7 shows a macrograph of the cross section of an FSW weld metal with copper-coated reinforcement particles and results of hardness tests carried out across the weld metal. The results suggest that the addition of the copper-coated aluminum oxide particles effectively increases the hardness of the FSW weld metal of aluminum alloy 6061 (not aluminum alloy 6061 metal matrix composite).

Comparing FIG. 5 with FIG. 7, it is obvious that the hardness of the weld metal is significantly improved after the weld metal being added with copper-coated aluminum oxide particles. The average increase in hardness is about 15% compared to the FSW weld metal (stir zone) without copper-coated aluminum oxide particles.

In summary, the strength of the FSW weld metal of aluminum alloy 6061 (not aluminum alloy 6061 matrix composite is effectively increased by the application of the present invention. Thus it is expected that the addition of copper-coated aluminum oxide particles into weld metal of aluminum alloy 6061 metal matrix composite must result in an additional effect on increasing the strength of the FSW meld metal of MMC by the application of this invention to MMC.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A manufacturing method of metal matrix composites (MMC) using friction stir welding (FSW), comprising the steps of:

providing two metal base materials;

coating surfaces of micron-scale reinforcement particles with a metal film to produce metal-coated reinforcement particles;

positioning a predetermined quantity of said metal-coated reinforcement particles in contact with each of said two metal base materials; and using a friction stir welding apparatus, stirring said metal-coated reinforcement particles into said two metal base materials, thereby producing a friction stir weld metal formed from the two metal base materials, wherein metallurgical bonding is achieved between the metal-coated reinforcement particles and the two metal base materials.

2. The method as claimed in claim 1, wherein the metal coating is coated on the reinforcement particles by electroless plating.

3. The method as claimed in claim 1, wherein the metal-coated reinforcement particles are silicon carbide or aluminum oxide.

4. The method as claimed in claim 1, wherein diameter of the reinforcement particles ranges from 0.25 μm to 70 μm.

5. The method as claimed in claim 1, wherein a material for the metal coating on the reinforcement particles is selected from copper, nickel, and silver.

6. The method as claimed in claim 1, wherein the two metal base materials are selected from aluminum alloys, magnesium alloys, aluminum alloy matrix composites, and magnesium alloy matrix composites.

7. The method as claimed in claim 1, wherein a volume fraction of the metal-coated reinforcement particles in the friction stir weld metal of the two metal base materials ranges from 0% to 30%.

* * * * *